Figure 1:
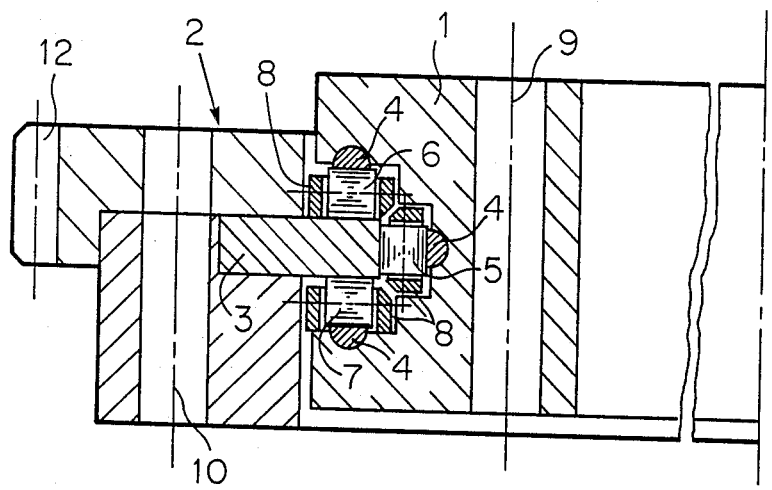

United States Patent [19]

Sinner

[11] Patent Number: 4,828,405
[45] Date of Patent: May 9, 1989

[54] LARGE ROLLER BEARING

[75] Inventor: Karl-Helmut Sinner, Dortmund, Fed. Rep. of Germany

[73] Assignee: Hoesch Aktiengesellschaft, Dortmund, Fed. Rep. of Germany

[21] Appl. No.: 209,340

[22] Filed: Jun. 20, 1988

[30] Foreign Application Priority Data

Jul. 29, 1987 [DE] Fed. Rep. of Germany ....... 3725027

[51] Int. Cl.$^4$ .............................................. F16C 19/38
[52] U.S. Cl. ...................................... 384/455; 384/569; 384/622
[58] Field of Search ............... 384/455, 501, 569, 622, 384/621, 557, 570

[56] References Cited

U.S. PATENT DOCUMENTS

| 3,304,137 | 2/1967 | Strassberg | 384/455 |
| 3,517,975 | 6/1970 | Lonngren et al. | 384/622 |
| 3,802,755 | 4/1974 | Schluter et al. | 384/455 |
| 4,573,811 | 3/1986 | Andree et al. | 384/622 |

Primary Examiner—Lenard A. Footland
Attorney, Agent, or Firm—Max Fogiel

[57] ABSTRACT

To provide a large roller bearing with races in the form of wires inserted into the rings with radial and axial rows of rollers between them that will be compact, strong, and stiff and will exhibit low deviations in torque when rotated 360°, one race wire (3) is in the form of a rectangular disk that extends radially, is approximately as thick as the rollers in the radial row (5) are wide, and is enclosed by all the rows (5, 6, and 7) of rollers.

5 Claims, 2 Drawing Sheets

LARGE ROLLER BEARING

The invention concerns a large roller bearing as recited in the preamble to claim 1.

Roller bearings of this type are employed in applications wherein the rings are made out of a material that does not have sufficient surface hardness to resist the forces of the rollers. The rings in these bearings are made our of aluminum or plastic for instance and the inserted race wires out of hardened steel.

A larger roller bearing of the aforesaid type is known from German GM No. 1 879 514. The races in this bearing are square wires. One drawback to this state of the art is that manufacturing tolerances at the rings, the race wires, and the rollers cannot be compensated. Furthermore, torsion in the adjacent components leads to constraint and local tension peaks in the bearing system. These drawbacks are eliminated in a bearing disclosed in German OS No. 2 724 849 by means of half-round race wires, which, however, make the design very expensive. The bearing demands a lot of space and has low inherent stiffness due to the potential for deformation and relative motion between the half-round wire and its seating.

The object of the present invention is accordingly to provide a bearing of the aforesaid genus that will be compact, strong, and stiff and will exhibit low deviations in torque when rotated 360°.

This object is attained in accordance with the invention by the characteristics recited in the body of claim 1. Further useful and practical embodiments are recited in the subsidiary claims.

The large roller bearing in accordance with the invention not only attains the object but also ensures the advantages of economical manufacture by reducing the separate components, satisfactory attenuation, and very high precision. The precision of the bearing is dictated almost exclusively by the race wire, which is in the form of a rectangular radial disk. The wire can be ground both axially and radially to very high precision. The other components of the pre-tensioned race system adapt to this high level of precision.

The practical radial sectioning addressed in claim 2 results in at least one breathing impact along the circumference. Several sections result in wire segments, which allow practical compensation of temperature stress and facilitate manufacture and assembly.

Figure 2:
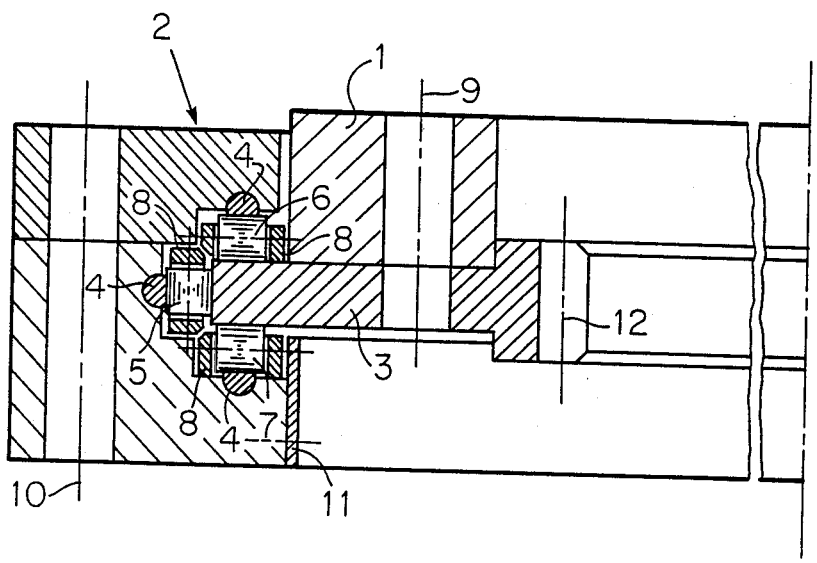
Figure 3:
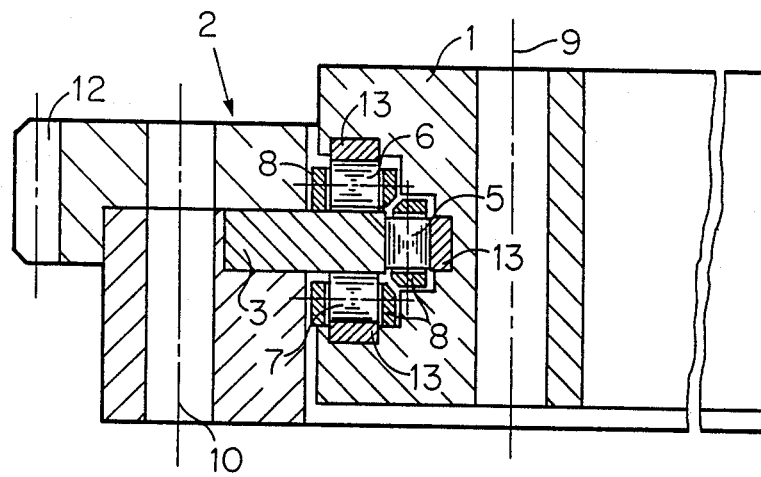

Various embodiments of the roller bearing in accordance with the invention will now be specified with reference to the drawing, wherein FIG. 1 is a section through half of a bearing, FIG. 2 is a section through half of another bearing, and FIG. 3 is a section through half of still another bearing.

As will be evident from FIGS. 1 through 3, each large roller bearing consists of an inner ring 1 and an outer ring 2. Rings 1 and 2 can either be continuous or sectioned into two rings.

Between rings 1 and 2 are systems of rollers. Those in the illustrated embodiments consist of a radial row 5 of rollers that act in conjunction with two opposing axial rows 6 and 7 of rollers.

A rectangular radial race wire 3 is inserted into a recess in the sectioned outer ring 2 of the bearing embodiment illustrated in FIG. 1. Race wire 3 is radially in the form of a disk and is sectioned into segments. It is approximately as thick as the rollers in radial row 5 of rollers are wide, and its forward section extends into inner ring 1. The rectangular race wire 3, which preferably consists of hardened and polished steel, in this case has races, over which both radial row 5 of rollers and axial rows 6 and 7 of rollers roll.

The rollers in inner ring 1 rest on half-round race wires 4 accommodated on matching seats in the ring. Wires 4 are flexible enough to impede high edge compression between the rollers and the wires and accordingly ensure a uniform distribution of load throughout the rollers and optimize the torque action of the bearing. Cages 8 position the rollers.

To allow the bearing to be secured to an adjacent mechanism both inner ring 1 and outer ring 2 have bores 9 and 10. Outer ring 2 also has teeth 12.

The overall systematics of the embodiment illustrated in FIG. 2 are similar to those of the embodiment illustrated in FIG. 1. The race wire 3 in this case is associated with inner ring 1 and extends over its total width, terminating in teeth 12 at the inside diameter. Outer ring 2 is again in sections and accommodates half-round race wires 4 in matching seats. The cage 8 for the lower axial row 7 of rollers is positioned by a baffle 11.

The embodiment illustrated in FIG. 3 is similar to that illustrated in FIG. 1, although the race wires 13 seated in inner ring 1 also have a rectangular cross-section. A bearing of this type is extremely stiff.

I claim:

1. Large roller bearing with races in the form of wires inserted into the rings with radial and axial rows of rollers between them, one race wire being in the form of a rectangular disk that extends radially, is approximately as thick as the rollers in the radial row are wide, and is enclosed by all the rows of rollers.

2. Large roller bearing as in claim 1, said one race wire being radially sectioned once or more.

3. Large roller bearing as in claim 1, said one race wire being accommodated in a recess in the ring associated with it.

4. Large roller bearing as in claim 1, said one race wire being extends over the whole width of its associated ring and is frictionally connected to it.

5. Large roller bearing as in claim 1, said one race wire being in the form of a cogwheel and/or a sealing or positioning surface in relation to the races.

* * * * *